United States Patent
Park et al.

(10) Patent No.: US 10,256,510 B2
(45) Date of Patent: Apr. 9, 2019

(54) ELECTROLYTE FOR SODIUM SECONDARY BATTERY AND SODIUM SECONDARY BATTERY USING THE SAME

(71) Applicant: SK Innovation Co., Ltd., Seoul (KR)

(72) Inventors: Dai In Park, Daejeon (KR); Seung Ok Lee, Daejeon (KR); Jeong Soo Kim, Daejeon (KR); Hyung Keun Lee, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 341 days.

(21) Appl. No.: 15/041,323

(22) Filed: Feb. 11, 2016

(65) Prior Publication Data

US 2016/0240890 A1   Aug. 18, 2016

(30) Foreign Application Priority Data

Feb. 13, 2015  (KR) ........................ 10-2015-0022508

(51) Int. Cl.
*H01M 10/39*  (2006.01)

(52) U.S. Cl.
CPC ......... *H01M 10/399* (2013.01); *H01M 10/39* (2013.01); *H01M 2300/002* (2013.01); *H01M 2300/0048* (2013.01)

(58) Field of Classification Search
CPC ............... H01M 10/39; H01M 10/399; H01M 2300/0048; H01M 2300/002
See application file for complete search history.

(56) References Cited

U.S. PATENT DOCUMENTS

| | | | | |
|---|---|---|---|---|
| 3,579,382 A | * | 5/1971 | Christopher | .......... C04B 35/113 220/2.1 R |
| 2003/0054255 A1 | | 3/2003 | Hidaka et al. | |
| 2007/0154814 A1 | * | 7/2007 | Ryu | .................... H01M 10/399 429/321 |
| 2010/0279174 A1 | * | 11/2010 | Young | ..................... H01M 4/40 429/303 |
| 2013/0084474 A1 | * | 4/2013 | Mills | ................... H01M 4/9016 429/9 |

FOREIGN PATENT DOCUMENTS

CN            103022577       *    4/2013

OTHER PUBLICATIONS

CN103022577MT (Year: 2013).*

* cited by examiner

*Primary Examiner* — Alexander Usyatinsky
(74) *Attorney, Agent, or Firm* — The Webb Law Firm

(57) ABSTRACT

Provided are an electrolyte for a sodium secondary battery, and a sodium secondary battery using the same, and the sodium secondary battery using the electrolyte for a sodium secondary battery according to the present invention may have an excellent cycle characteristic, charge-discharge capacity, and stability, thereby making it possible to be operated without deterioration at a low temperature for a long time.

10 Claims, 1 Drawing Sheet

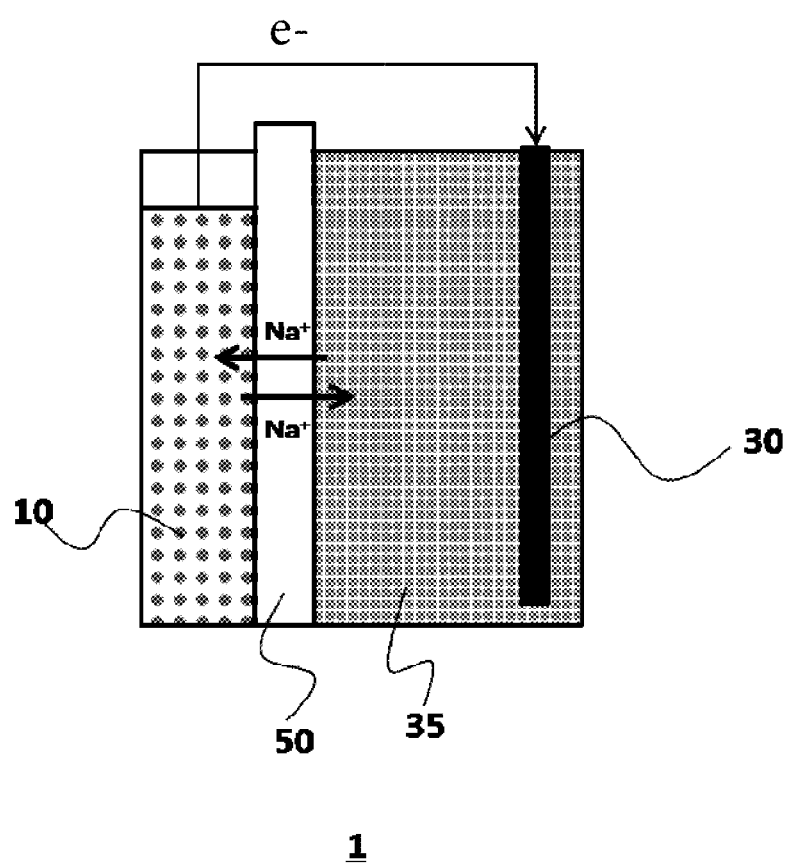
1

ELECTROLYTE FOR SODIUM SECONDARY BATTERY AND SODIUM SECONDARY BATTERY USING THE SAME

CROSS-REFERENCE TO RELATED APPLICATION

This application claims priority to Korean Patent Application No. 10-2015-0022508 filed Feb. 13, 2015, the disclosure of which is hereby incorporated in its entirety by reference.

TECHNICAL FIELD

The following disclosure relates to an electrolyte for a sodium secondary battery, and a sodium secondary battery using the same, and more particularly, to an electrolyte for a sodium secondary battery containing a first additive and a second additive, and a sodium secondary battery using the same.

BACKGROUND

As a use of renewable energy rapidly increases, a need for an energy storage device using a battery rapidly increases. As the battery, a lead battery, a nickel/hydrogen battery, a vanadium battery and a lithium battery may be used. However, the lead battery and the nickel/hydrogen battery have significantly low energy density which is a problem in that a large space is required to store energy having the same capacity. In addition, the vanadium battery has a problem in that environmental pollution is caused by using a solution containing heavy metals, and amounts of anode and cathode materials that are moved through a membrane separating the anode and the cathode are small, which causes deterioration of performance, such that mass-production of the vanadium battery has not been achieved yet. The lithium battery having significantly excellent energy density and output characteristic is technically advantageous. However, it is difficult to be economically used as a secondary battery for large scale power storage due to scarcity of a resource of a lithium material.

To solve this problem, there are a number of attempts to use sodium, which is an abundant resource on the earth, as a material of the secondary battery.

Among them, as described in US Patent Application Publication No. 20030054255, a sodium-sulfur battery using beta alumina having selective conductivity with regard to sodium ions and having an anode supported with sodium and a cathode supported with sulfur, has been currently used as a large scale power storage device.

However, upon considering conductivity and melting point of battery components, the existing sodium-based secondary batteries such as a sodium-sulfur battery or a sodium-nickel chloride battery have disadvantages. Specifically, the sodium-nickel chloride battery has an operating temperature of at least 250° C., and the sodium-sulfur battery has an operating temperature of at least 300° C. Due to the above-described problems, the sodium-based secondary batteries are economically disadvantageous in view of manufacture or operation for maintaining temperature, for maintaining air tightness, and for reinforcing safety.

In order to solve the foregoing problems, a room temperature-type, sodium-based battery is being developed, however, which has a very small output, and is much less capable than a nickel-hydrogen battery or a lithium battery.

RELATED ART DOCUMENT (Patent Document 1) U.S. Patent Application Publication No. 20030054255

SUMMARY

An embodiment of the present invention is directed to providing an electrolyte for a sodium secondary battery having high thermal stability while simultaneously having a low melting point and high ionic conductivity.

Another embodiment of the present invention is directed to providing a sodium secondary battery using the electrolyte for a sodium secondary battery.

The present invention provides an electrolyte for a sodium secondary battery having a low melting point and high stability.

In one general aspect, the electrolyte for a sodium secondary battery includes: a sodium molten salt, a first additive represented by Chemical Formula 1, and a second additive represented by Chemical Formula 2:

$Na_xA$     [Chemical Formula 1]

$NaD$     [Chemical Formula 2]

in Chemical Formulas 1 and 2,

A is a sulfate ion, or a nitrate ion ($NO_3$—), x is an integer selected from 1 to 4 depending on an ionic valency of A; and D is selected from NCO—, NCS— or compounds represented by Chemical Formulas 3 to 6,

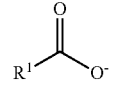

[Chemical Formula 3]

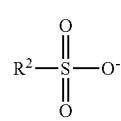

[Chemical Formula 4]

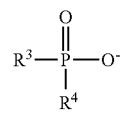

[Chemical Formula 5]

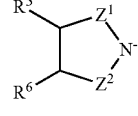

[Chemical Formula 6]

in Chemical Formulas 3 to 6, $R^1$ to $R^6$ are each independently hydrogen, (C1-C10)alkyl, (C1-C10)alkoxy, (C2-C10)alkenyl, (C2-C10)alkynyl, (C6-C12)aryl, (C3-C12)heteroaryl or (C6-C12)aryl(C1-C10)alkyl;

$R^5$ and $R^6$ may be linked to each other to form an alicyclic ring or an aromatic ring;

$Z^1$ and $Z^2$ are each independently —CO— or —$SO_2$—, and the alkyl, alkoxy, alkenyl, alkynyl, aryl, heteroaryl and arylalkyl of $R^1$ to $R^6$ and the alicyclic ring and the aromatic ring of $R^5$ and $R^6$ may be further substituted with halogen, amino, nitro or (C1-C10)alkyl.

A in Chemical Formula 1 may be $SO_4^{2-}$, $SO_3^{2-}$, $SO_5^{2-}$, $S_2O_3^{2-}$, $S_2O_4^{2-}$, $S_2O_5^{2-}$, $S_2O_6^{2-}$, $S_2O_7^{2-}$, $S_2O_8^{2-}$ or $S_4O_6^{2-}$.

The first additive may be sodium sulfate ($Na_2SO_4$), anhydrous sodium sulfate ($Na_2SO_3$), sodium thiosulfate ($Na_2S_2O_3$), sodium metabisulfite ($Na_2S_2O_5$), sodium pyrosulfate ($Na_2S_2O_7$) or sodium nitrate ($NaNO_3$).

In Chemical Formulas 3 and 4, $R^1$ to $R^6$ may be each independently hydrogen or (C1-C10)alkyl;

$R^5$ and $R^6$ may be linked to each other by (C2-C4) alkenylene to form an aromatic ring;

the alkyl of $R^1$ to $R^6$ and the aromatic ring of $R^5$ and $R^6$ may be further substituted with halogen, amino, nitro or (C1-C10)alkyl;

$Z^1$ may be —CO—; and $Z^2$ may be —$SO_2$—.

D in Chemical Formula 2 may be HCOO—, $CH_3$COO—, NCO—, NCS— or Saccharin anion.

The first additive may be $Na_2SO_4$, $Na_2SO_3$, $Na_2S_2O_3$, $Na_2S_2O_5$, $Na_2S_2O_7$ or $NaNO_3$; and the second additive may be HCOONa, $CH_3$COONa, NaOCN, NaSCN or $C_7H_5O_3NSNa$ (sodium saccharin).

Each of the first additive and second additive may have an amount of 0.1 to 30 wt % relative to total weight of the electrolyte for a sodium secondary battery, and the second additive may have 0.05 to 1.0 mol relative to 1 mol of the first additive.

When the electrolyte is melted, ionic conductivity may be 140 ms/cm or more, and a melting point may be 140° C. or less.

The sodium molten salt may be $NaAlCl_4$, $NaBrCl_4$, $NaICl_4$, and mixtures thereof.

In another general aspect, a sodium secondary battery includes: a cathode impregnated with the electrolyte for a sodium secondary battery as described above and including a transition metal; an anode containing sodium; and a sodium ion conducting solid electrolyte provided between the cathode and the anode.

BRIEF DESCRIPTION OF THE DRAWINGS

FIG. 1 is a conceptual diagram schematically illustrating a structure of a sodium secondary battery according to an exemplary embodiment of the present invention (1: sodium secondary battery, 10: cathode, 30: anode, 35: electrolyte, 50: solid electrolyte).

DETAILED DESCRIPTION OF EMBODIMENTS

The present invention provides an electrolyte for a sodium secondary battery for implementing a sodium secondary battery having significantly excellent charge-discharge capacity characteristics, cycle characteristic and stability while simultaneously being capable of being operated at a low temperature without rapidly deteriorating ionic conductivity. The electrolyte for a sodium secondary battery includes a sodium molten salt, a first additive represented by Chemical Formula 1, and a second additive represented by Chemical Formula 2:

A     [Chemical Formula 1]

     [Chemical Formula 2]

in Chemical Formulas 1 and 2,

A is a sulfate ion, or a nitrate ion, x is an integer selected from 1 to 4 depending on an ionic valency of A; and D is selected from NCO—, NCS— or compounds represented by Chemical Formulas 3 to 6,

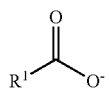 [Chemical Formula 3]

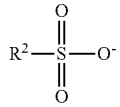 [Chemical Formula 4]

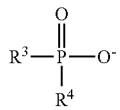 [Chemical Formula 5]

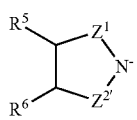 [Chemical Formula 6]

in Chemical Formulas 3 to 6, $R^1$ to $R^6$ are each independently hydrogen, (C1-C10) alkyl, (C1-C10)alkoxy, (C2-C10)alkenyl, (C2-C10)alkynyl, (C6-C12)aryl, (C3-C12)heteroaryl or (C6-C12)aryl(C1-C10)alkyl;

$R^5$ and $R^6$ may be linked to each other to form an alicyclic ring or an aromatic ring;

$Z^1$ and $Z^2$ are each independently —CO— or —$SO_2$—, and the alkyl, alkoxy, alkenyl, alkynyl, aryl, heteroaryl and arylalkyl of $R^1$ to $R^6$ and the alicyclic ring and the aromatic ring of $R^5$ and $R^6$ may be further substituted with halogen, amino, nitro or (C1-C10)alkyl.

In general, a secondary battery such as ZEBRA battery, or the like, has sodium aluminum chloride ($NaAlCl_4$) as a molten salt electrolyte, and it is known that the sodium aluminum chloride ($NaAlCl_4$) molten salt is advantageous in view of stability and ionic conductivity of the sodium secondary battery.

However, since the sodium aluminum chloride ($NaAlCl_4$) molten salt has a melting point at 155° C. to 200° C. depending on purity, a secondary battery manufactured by using the sodium aluminum chloride ($NaAlCl_4$) molten salt has a limitation in that an operating temperature thereof is significantly high, which substantially reaches 300° C.

Meanwhile, the electrolyte for a sodium secondary battery of the present invention is prepared by simultaneously including the first additive represented by Chemical Formula 1 and the second additive represented by Chemical Formula 2 which are specific sodium salts, such that the melting point may be decreased while maintaining ionic conductivity of the electrolyte as it is. Accordingly, the sodium secondary battery using the electrolyte for a sodium secondary battery may be operated at a, a low temperature, preferably, 120 to 200° C., more preferably, 120 to 200° C.

That is, the electrolyte for a sodium secondary battery of the present invention is prepared by simultaneously adding two additives (specific compounds), thereby having a low melting point without significant change in ionic conductivity as compared to the existing electrolyte of the sodium aluminum chloride ($NaAlCl_4$) molten salt.

In addition, the sodium secondary battery manufactured by using the electrolyte for a sodium secondary battery of the present invention prepared by simultaneously adding two specific additives may have improved thermal stability to prevent deterioration, thereby improving a lifespan characteristic of the battery, and further, improving a cycle characteristic and charge-discharge capacity characteristics, even though the reason is not clearly identified.

Sulfate ions described in the present invention means ions consisting of combinations of a sulfur atom and an oxygen atom, and may be represented by Chemical Formula 11 below:

$$S_aO_b^{2-}$$ [Chemical Formula 11]

in Chemical Formula 11, a is a real number of 1≤a<4, and b is a real number of 1<b<9.

In Chemical Formula 1 according to an exemplary embodiment of the present invention, A may be $SO_4^{2-}$, $SO_3^{2-}$, $SO_5^{2-}$, $S_2O_3^{2-}$, $S_2O_4^{2-}$, $S_2O_5^{2-}$, $S_2O_6^{2-}$, $S_2O_7^{2-}$, $S_2O_8^{2-}$ or $S_4O_6^{2-}$, preferably $SO_4^{2-}$.

Preferably, the first additive represented by Chemical Formula 1 according to an exemplary embodiment of the present invention may be sodium sulfate ($Na_2SO_4$), anhydrous sodium sulfate ($Na_2SO_3$), sodium thiosulfate ($Na_2S_2O_3$), sodium metabisulfite ($Na_2S_2O_5$), sodium pyrosulfate ($Na_2S_2O_7$) or sodium nitrate ($NaNO_3$).

In Chemical Formulas 3 and 4 according to an exemplary embodiment of the present invention, $R^1$ to $R^6$ may be each independently hydrogen or (C1-C10)alkyl; $R^5$ and $R^6$ may be linked to each other by (C2-C4)alkenylene to form an aromatic ring; the alkyl of $R^1$ to $R^6$ and the aromatic ring of $R^5$ and $R^6$ may be further substituted with halogen, amino, nitro or (C1-C10)alkyl; $Z^1$ may be —CO—; and $Z^2$ may be —$SO_2$—, and more specifically, may be HCOONa (sodium formate), $CH_3COONa$ (sodium acetate), NaOCN (sodium cyanate), NaSCN (sodium thiocyanate), $C_7H_5O_3NSNa$ (sodium saccharin) or $C_7H_5O_3NSNa$ hydrate.

The first additive according to an exemplary embodiment of the present invention may be sodium sulfate ($Na_2SO_4$), anhydrous sodium sulfate ($Na_2SO_3$), sodium thiosulfate ($Na_2S_2O_3$), sodium metabisulfite ($Na_2S_2O_5$), sodium pyrosulfate ($Na_2S_2O_7$) or sodium nitrate ($NaNO_3$), and the second additive may be HCOONa, $CH_3COONa$, NaOCN, NaSCN or $C_7H_5O_3NSNa$ (sodium saccharin), and more preferably, the first additive may be $Na_2SO_4$, $Na_2SO_3$ or $Na_2S_2O_3$; and the second additive may be NaOCN or NaSCN in view of achieving excellent stability, cycle characteristic, and charge-discharge capacity.

Each of the first additive and second additive according to an exemplary embodiment of the present invention may have an amount of 0.1 to 30 wt % relative to total weight of the electrolyte for a sodium secondary battery. Preferably, the first additive may have an amount of 3 to 10 wt %, and the second additive may have an amount of 0.1 to 3 wt %. A mixing ratio between the first additive and the second additive is not limited, but preferably, the second additive may have 0.05 to 1.0 mol, more preferably, 0.1 to 0.5 mol, relative to 1 mol of the first additive.

The electrolyte for a sodium secondary battery according to an exemplary embodiment of the present invention may have ionic conductivity of 140 ms/cm or more, preferably, 300 ms/cm or more, and a melting point of 150° C. or less, preferably, 140° C. or less.

The sodium molten salt according to an exemplary embodiment of the present invention may be used without significant limitation as long as it is an electrolyte material being applicable to the existing sodium secondary battery. As non-limiting specific examples thereof, sodium aluminum chloride ($NaAlCl_4$), sodium bromide chloride ($NaBrCl_4$), sodium iodine chloride ($NaICl_4$), and the like, may be included, and preferably, sodium aluminum chloride ($NaAlCl_4$) may be included in view of a melting point, ionic conductivity, thermal stability, and preferable combinations of the additives of the present invention.

The sodium aluminum chloride ($NaAlCl_4$) which is the sodium molten salt according to an exemplary embodiment of the present invention may be obtained by adding NaCl and $AlCl_3$ to an electrolyte.

"Alkyl", "alkoxy", and other substituents including "alkyl" part of the present invention include all linear or branched types, and have 1 to 10 carbon atoms, preferably, 1 to 6 carbon atoms, and more preferably, 1 to 4 carbon atoms.

In addition, "aryl" described in the present invention, which is an organic radical derived from aromatic hydrocarbon by removal of one hydrogen, includes single or fused ring system including 4 to 7 ring atoms, preferably 5 or 6 ring atoms in each ring, and even includes a plurality of aryls linked by a single bond. Specific examples of aryl may include phenyl, naphthyl, biphenyl, anthryl, indenyl, fluorenyl, and the like, but the present invention is not limited thereto.

Further, "heteroaryl" described in the present invention, which means an aryl group including 1 to 4 heteroatoms selected from B, N, O, S, P(=O), Si and P as an aromatic ring framework atom and including carbon as the remaining aromatic ring framework atom, includes 5- to 6-membered monocyclic heteroaryl and polycyclic heteroaryl condensed with at least one benzene ring, and may be partially saturated. In addition, heteroaryl in the present invention may include one or more heteroaryl(s) linked by a single bond.

"Alkenyl" described alone or as a portion of another group in the present invention means a linear-, branched-, or a cyclic hydrocarbon radical including 2 to 10 carbon atoms and at least one carbon to carbon double bond. A more preferable alkenyl radical is a lower alkenyl radical having 2 to about 6 carbon atoms. The most preferable lower alkenyl radical is a radical having 2 to about 4 carbon atoms. In addition, the alkenyl group may be substituted at any available bonding point. Examples of the alkenyl radical include ethenyl, propenyl, allyl, propenyl, butenyl and 4-methylbutenyl. "Alkenyl" and "lower alkenyl" include radical having cis and trans orientations, or alternatively, E and Z orientation.

"Alkynyl" described in the present invention alone or as a portion of another group means a linear-, branched-, or a cyclic hydrocarbon radical containing 2 to 10 carbon atoms and at least one carbon to carbon triple bond. A more preferable alkynyl radical is a lower alkynyl radical having 2 to about 6 carbon atoms. The most preferable alkynyl radical is a lower alkynyl radical having 2 to about 4 carbon atoms. Examples of the alkynyl radical include propargyl, butynyl, and the like. In addition, the alkynyl group may be substituted at any available binding point.

Further, the present invention provides a sodium secondary battery using the electrolyte for a sodium secondary battery of the present invention.

Specifically, the sodium secondary battery according to an exemplary embodiment of the present invention includes an anode containing sodium, a cathode including a transition metal, and a sodium ion conducting solid electrolyte provided between the cathode and the anode as illustrated in FIG. 1, wherein the cathode is impregnated into the electrolyte for a sodium secondary battery of the present invention.

In the sodium secondary battery according to an exemplary embodiment of the present invention, the anode may include metal sodium or sodium alloy. As a non-limiting example thereof, the sodium alloy may be sodium and cesium, sodium and rubidium or mixtures thereof. An anode active material may be a solid or a liquid including a molten phase at an operating temperature of the battery. Here, in order to implement capacity of the battery of 50 Wh/kg or more, the anode active material may be sodium or molten sodium (molten Na).

In the sodium secondary battery according to the exemplary embodiment of the present invention, the cathode of the sodium secondary battery may include a transition metal. Here, the transition metal may include copper, silver, gold, nickel, palladium, platinum, cobalt, rhodium, iridium, iron, manganese, chromium, vanadium, molybdenum, and the like, preferably, may include one metal selected from the group consisting of nickel (Ni), copper (Cu), iron (Fe), manganese (Mn), cobalt (Co) and alloys thereof.

Meanwhile, the sodium secondary battery according to an exemplary embodiment of the present invention may be charged by Reaction Formula 1 and may be discharged by Reaction Formula 2, and the charging and discharging reaction of the battery may be generated in the cathode of the sodium secondary battery.

  Reaction Formula 1

$Ni + 2NaCl \rightarrow NiCl_2 + 2Na^+ + 2e^-$  Reaction Formula 1

  Reaction Formula 2

$NiCl_2 + 2Na^+ + 2e^- \rightarrow Ni + 2NaCl$  Reaction Formula 2

Here, the present invention provides a sodium secondary battery, such that alkali metal ions (that is, sodium ions) generated by the charging reaction of the battery may be an ion conduction (transport) material passing through the solid electrolyte in the battery to be directly delivered to the anode. Further, the electrolyte for a sodium secondary battery according to the present invention includes sodium ions, such that the sodium ions dissociated from the electrolyte for a sodium secondary battery may also serve as the ion conduction (transport) material, which is preferable to improve ionic conductivity of the sodium secondary battery.

In the sodium secondary battery according to an exemplary embodiment of the present invention, the solid electrolyte may be provided between the cathode and the anode, and may consist of sodium ion conducting solid electrolyte. Here, the sodium ion conducting solid electrolyte is any material as long as it physically separates the cathode and the anode, and has selective conductivity to sodium ions. That is, a material generally used in a battery field for selective conduction of sodium ions may be used as the sodium ion conducting solid electrolyte. As non-limiting examples thereof, the solid electrolyte according to an exemplary embodiment of the present invention may be a sodium (Na) super ionic conductor (NaSICON), β-alumina or β"-alumina. In addition, as non-limiting examples thereof, the Na super ionic conductor (NaSICON) may include Na—Zr—Si—O-based complex oxide, Na—Zr—Si—P—O-based complex oxide, Y doped Na—Zr—Si—P—O-based complex oxide, Fe doped Na—Zr—Si—P—O-based complex oxide, or mixtures thereof, specifically, $Na_3Zr_2Si_2PO_{12}$, $Na_{1+x}Si_xZr_2P_3-xO_{12}$ (x is a real number of 1.6<x<2.4), wherein Y doped or Fe doped $Na_3Zr_2Si_2PO_{12}$, Y doped or Fe doped $Na_{1+x}Si_xZr_2P_{3-x}O_{12}$ (x is a real number of 1.6<x<2.4) or mixtures thereof.

In the sodium secondary battery according to an exemplary embodiment of the present invention, the sodium secondary battery may have a plate type battery structure including a plate shaped solid electrolyte, or a tube type battery structure including a tube shaped solid electrolyte in which one end is sealed, on the basis of the shape of the solid electrolyte separating the anode and the cathode to be divided into an anode space and a cathode space.

Upon considering conductivity and melting point of battery components, the existing sodium-based secondary batteries have disadvantages. Specifically, the sodium-nickel chloride battery has an operating temperature of at least 250° C., and the sodium-sulfur battery has an operating temperature of at least 300° C.

However, the sodium secondary battery according to an exemplary embodiment of the present invention may be operated even at a low temperature by using the electrolyte for a sodium secondary battery of the present invention including the first additive represented by Chemical Formula 1 and the second additive represented by Chemical Formula 2 to decrease a melting point of the electrolyte without deteriorating ionic conductivity.

Specifically, the operating temperature of the sodium secondary battery according to an exemplary embodiment of the present invention may be 120 to 200° C., more preferably, 120 to 200° C.

Hereinafter, specific exemplary embodiments according to the present invention are described.

Here, unless technical and scientific terms used herein are defined otherwise, they have meanings generally understood by those skilled in the art to which the present invention pertains. Known functions and components which obscure the gist of the present invention in the following description and the accompanying drawings will be omitted.

[Examples 1 to 4] Preparation of Electrolyte 1

Electrolytes 1 to 4 were prepared by mixing NaOCN, $Na_2SO_4$, NaCl and $AlCl_3$ as shown in Table 1 below, followed by heating at 170° C. for 8 hours, cooling to room temperature, and pulverizing. Properties of each of the prepared electrolytes 1 to 4 were also shown in Table 1.

Comparative Example 1

An electrolyte of Comparative Example 1 was prepared by the same method as Example 1 except for using 99.99% NaCl and purified $AlCl_3$ at a ratio shown in Table 1 instead of using NaOCN, $Na_2SO_4$, NaCl and $AlCl_2$ in Example 1, and properties of the prepared electrolyte of Comparative Example 1 were shown in Table 1.

Comparative Example 2

An electrolyte of Comparative Example 2 was prepared by the same method as Example 1 except for using $Na_2SO_4$, NaCl, and $AlCl_3$ at a ratio shown in Table 1 instead of using NaOCN, $Na_2SO_4$, NaCl and $AlCl_2$ in Example 1, and properties of the prepared electrolyte of Comparative Example 2 were shown in Table 1.

Comparative Example 3

An electrolyte of Comparative Example 3 was prepared by the same method as Example 1 except for using NaOCN, NaCl, and $AlCl_3$ at a ratio shown in Table 1 instead of using NaOCN, $Na_2SO_4$, NaCl and $AlCl_2$ in Example 1, and properties of the prepared electrolyte of Comparative Example 3 were shown in Table 1.

TABLE 1

| Classification | Sodium Molten Salt and Additives | Molar Ratio | Weight Ratio | Melting Point (° C.) | Ionic Conductivity (ms/cm) (at, 180° C.) |
|---|---|---|---|---|---|
| Example 1 (Electrolyte 1) | NaOCN/Na$_2$SO$_4$/NaCl/AlCl$_3$ | 1.4:3.4:46.8:48.3 | 1.0:5.0:28.0:66.0 | 135 | 382.55 |
| Example 2 (Electrolyte 2) | NaOCN/Na$_2$SO$_4$/NaCl/AlCl$_3$ | 1.0:3.4:47.3:48.3 | 0.6:5.0:28.4:66.0 | 140 | 374.49 |
| Example 3 (Electrolyte 1) | NaOCN/Na$_2$SO$_4$/NaCl/AlCl$_3$ | 0.5:3.4:47.8:48.3 | 0.3:5.0:28.7:66.0 | 140 | 375.19 |
| Example 4 (Electrolyte 3) | NaOCN/Na$_2$SO$_4$/NaCl/AlCl$_3$ | 1.4:4.8:46.2:47.6 | 1.0:7.0:27.4:64.6 | 143 | 321.64 |
| Comparative Example 1 (Electrolyte of Comparative Example 1) | 99.99% NaCl + purified AlCl$_3$ | 53:47 | 9.2 | 155 | 361.83 |
| Comparative Example 2 (Electrolyte of Comparative Example 2) | Na$_2$SO$_4$/NaCl/AlCl$_3$ | 3.4:51.2:45.4 | 5.0:31.0:64.0 | 130 | 398.28 |
| Comparative Example 3 (Electrolyte of Comparative Example 3) | NaOCN/NaCl/AlCl$_3$ | 5:45:50 | 3.0:27.0:70.0 | 130 | 427.28 |

The melting point of Table 1 was measured by heating mantle. The ionic conductivity was measured by a three-electrode impedance method using two sheets of platinum (Pt) plates (0.5×0.5 cm) as working/counter electrodes and Pt wire (diameter of 0.5 mm) as a reference electrode in a glove box in which moisture and oxygen have concentration of 0.1 ppm or less, respectively. For measuring impedance, a calibration curve was made by KCl aqueous solution.

As shown in Table 1, it could be appreciated that the melting point of the electrolyte for a sodium secondary battery containing two different additives of the present invention was lower than or the same as those of Comparative Examples 1 to 3. It could be appreciated that the ionic conductivity of the electrolyte for a sodium secondary battery according to the present invention was also maintained to the same level as those of Comparative Examples 1 to 3.

[Example 5] Manufacture of Sodium Secondary Battery 1

A cathode in which NaCl capacity is 170 mAh (thickness of 2 mm) was manufactured by mixing Ni (Inco 255) and NaCl at a molar ratio of 3:1, pulverization-mixing the mixture by a planetary ball mill, and compressing the mixture. An anode was manufactured by pressing sodium having purity of 99% or more (Sigma-Aldrich) at a thickness of 1 mm. A sodium secondary battery 1 was manufactured by impregnating the cathode with the prepared electrolyte 1 of Example 1 and using NASICON as a solid electrolyte. The charge-discharge characteristics and the cycle characteristic were measured as described below, and results thereof were shown in Table 2.

As shown in Table 2, it could be appreciated that the sodium secondary batteries 1 to 3 using the electrolytes 1 to 3 of the present invention had high charge-discharge capacity, and remarkably improved capacity retention rate and cycle characteristic, as compared to the sodium secondary batteries using the electrolytes of Comparative Examples 1 to 3.

[Example 6] Manufacture of Sodium Secondary Battery 2

A sodium secondary battery 2 was manufactured by the same method as Example 5 except for using the electrolyte 2 instead of using the electrolyte 1 of Example 5, and the charge-discharge characteristics and the cycle characteristic thereof were measured as described below.

[Example 7] Manufacture of Sodium Secondary Battery 3

A sodium secondary battery 3 was manufactured by the same method as Example 5 except for using the electrolyte 3 instead of using the electrolyte 1 of Example 5, and the charge-discharge characteristics and the cycle characteristic thereof were measured as described below.

[Comparative Examples 4 to 6] Manufacture of Sodium Secondary Batteries 4 to 6

Sodium secondary batteries 4 to 6 were manufactured by the same method as Example 5 except for using the electrolytes of Comparative Examples 1 to 3 instead of using the electrolyte 1 of Example 5, and the charge-discharge characteristics and the cycle characteristic thereof were measured as described below. Results thereof were shown in Table 1.

Measurement of Charge-Discharge Characteristics: A charging and discharging test was performed under a charging current density of 10 mA/cm$^2$ and a discharging current density of 50 mA/cm$^2$ at 195° C., at voltage range in which a charging end voltage is 2.85 V, and a discharging end voltage is 2.1 V.

Measurement of Cycle Characteristic: After the charge-discharge characteristics were measured, a test for measuring cycle characteristic (a cycle test) was performed under charging and discharging current density of 25 mA/cm$^2$ at 195° C., at voltage range in which a charging end voltage is 2.85 V, and a discharging end voltage is 2.1V.

TABLE 2

| Classification | Charge-Discharge Characteristics | | |
|---|---|---|---|
| | Discharge Capacity | Average Discharge Voltage | Capacity Retention Rate/ Number of Cycles |
| Example 5 (Electrolyte 1) | 80% | 2.428 | 97%/90 cyc |
| Example 6 (Electrolyte 2) | 82% | 2.409 | 94%/90 cyc |
| Example 7 (Electrolyte 3) | 83% | 2.394 | 61%/90 cyc |
| Comparative Example 4 (Electrolyte of Comparative Example 1) | 84% | 2.300 | 56%/90 cyc |
| Comparative Example 5 (Electrolyte of Comparative Example 2) | 92% | 2.310 | 0%/30 cyc |
| Comparative Example 6 (Electrolyte of Comparative Example 3) | 68% | 2.301 | 60%/90 cyc |

The electrolyte for a sodium secondary battery according to the present invention has a low melting point while simultaneously having high thermal stability and high ionic conductivity.

In addition, the sodium secondary battery according to the present invention manufactured by using the electrolyte for a sodium secondary battery according to the present invention, may be operated at a low temperature, a cycle characteristic may be improved with high ionic conductivity, thereby improving a lifespan characteristic of the battery, and charge-discharge characteristics may be excellent and deterioration may be prevented, thereby having high stability, that is, being non-volatile and non-explosive.

Hereinabove, although the present invention is described by specific matters, limited exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scopes and spirits of the invention.

What is claimed is:

1. An electrolyte for a sodium secondary battery comprising:
a sodium molten salt, a first additive represented by Chemical Formula 1, and a second additive represented by Chemical Formula 2, wherein each of the first additive and the second additive has an amount of 0.1 to 30 wt % relative to the total weight of the electrolyte for the sodium secondary battery:

$$Na_xA \quad \text{[Chemical Formula 1]}$$

$$NaD \quad \text{[Chemical Formula 2]}$$

in Chemical Formulas 1 and 2,
A is a sulfur oxide ion, or a nitrate ion,
x is an integer selected from 1 to 4 depending on an ionic valency of A; and
D is selected from NCO—, NCS- or compounds represented by Chemical Formulas 3 to 6,

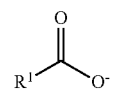

[Chemical Formula 3]

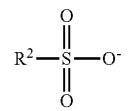

[Chemical Formula 4]

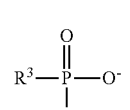

[Chemical Formula 5]

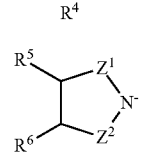

[Chemical Formula 6]

in Chemical Formulas 3 to 6,
$R^1$ to $R^6$ are each independently hydrogen, (C1-C10) alkyl, (C1-C10)alkoxy, (C2-C10)alkenyl, (C2-C10) alkynyl, (C6-C12)aryl, (C3-C12)heteroaryl or (C6-C12)aryl(C1-C10)alkyl;
$R^5$ and $R^6$ may be linked to each other to form an alicyclic ring or an aromatic ring;
$Z^1$ and $Z^2$ are each independently —CO— or $SO_2$—, and the alkyl, alkoxy, alkenyl, alkynyl, aryl, heteroaryl and arylalkyl of $R^1$ to $R^6$ and the alicyclic ring and the aromatic ring of $R^5$ and $R^6$ may be further substituted with halogen, amino, nitro or (C1-C10)alkyl.

2. The electrolyte for a sodium secondary battery of claim 1, wherein A in Chemical Formula 1 is $SO_4^{2-}$, $SO_3^{2-}$, $SO_5^{2-}$, $S_2O_3^{2-}$, $S_2O_4^{2-}$, $S_2O_5^{2-}$, $S_2O_6^{2-}$, $S_2O_7^{-2}$, $S_2O_8^{2-}$ or $S_4O_6^{2-}$.

3. The electrolyte for a sodium secondary battery of claim 1, wherein the first additive is sodium sulfate, anhydrous sodium sulfate, sodium thiosulfate, sodium metabisulfite, sodium pyrosulfate or sodium nitrate.

4. The electrolyte for a sodium secondary battery of claim 1, wherein in Chemical Formulas 3 and 4, $R^1$ to $R^6$ are each independently hydrogen or (C1-C10)alkyl;
$R^5$ and $R^6$ may be linked to each other by (C2-C4) alkenylene to form an aromatic ring;
the alkyl of $R^1$ to $R^6$ and the aromatic ring of $R^5$ and $R^6$ may be further substituted with halogen, amino, nitro or (C1-C10)alkyl;
$Z^1$ is CO—; and
$Z^2$ is —$SO_2$—.

5. The electrolyte for a sodium secondary battery of claim 1, wherein D in Chemical Formula 2 is HCOO—, $CH_3COO$—, NCO—, NCS— or Saccharin anion.

6. The electrolyte for a sodium secondary battery of claim 1, wherein the first additive is $Na_2SO_4$, $Na_2SO_3$, $Na_2S_2O_3$, $Na_2S_2O_5$, $Na_2S_2O_7$ or $NaNO_3$; and the second additive is HCOONa, $CH_3COONa$, NaOCN, NaSCN or $C_7H_5O_3NSNa$.

7. The electrolyte for a sodium secondary battery of claim 6, wherein the second additive has 0.05 to 1.0 mol relative to 1 mol of the first additive.

8. The electrolyte for a sodium secondary battery of claim 1, wherein when the electrolyte is melted, ionic conductivity is 140 ms/cm or more, and a melting point is 140° C. or less.

9. The electrolyte for a sodium secondary battery of claim 1, wherein the sodium molten salt is $NaAlCl_4$, $NaBrCl_4$, $NaICl_4$, and mixtures thereof.

10. A sodium secondary battery comprising:
- a cathode impregnated with the electrolyte for a sodium secondary battery of claim 1 and including a transition metal;
- an anode containing sodium; and
- a sodium ion conducting solid electrolyte provided between the cathode and the anode.

* * * * *

UNITED STATES PATENT AND TRADEMARK OFFICE
CERTIFICATE OF CORRECTION

PATENT NO. : 10,256,510 B2
APPLICATION NO. : 15/041323
DATED : April 9, 2019
INVENTOR(S) : Dai In Park et al.

Page 1 of 1

It is certified that error appears in the above-identified patent and that said Letters Patent is hereby corrected as shown below:

In the Claims

Column 12, Line 35, Claim 1, delete "$SO_2$—," and insert -- —$SO_2$—, --

Column 12, Line 42, Claim 2, delete "$S_2O_7^{-2}$," and insert -- $S_2O_7^{2-}$, --

Column 12, Line 55, Claim 4, delete "CO—;" and insert -- —CO—; --

<div align="right">

Signed and Sealed this
Eighteenth Day of June, 2019

Andrei Iancu
*Director of the United States Patent and Trademark Office*

</div>